United States Patent
Hsu et al.

(10) Patent No.: US 8,194,334 B2
(45) Date of Patent: Jun. 5, 2012

(54) IMAGE CAPTURE LENS MODULES AND IMAGE CAPTURE SYSTEMS

(75) Inventors: Yun-Chiang Hsu, Iaoyuan County (TW); Jau-Jan Deng, Taipei (TW)

(73) Assignees: VisEra Technologies Company Limited, Hsinchu Science Park (TW); OmniVision Technologies, Inc., Santa Clara, CA (US)

( * ) Notice: Subject to any disclaimer, the term of this patent is extended or adjusted under 35 U.S.C. 154(b) by 291 days.

(21) Appl. No.: 12/757,563

(22) Filed: Apr. 9, 2010

(65) Prior Publication Data

US 2011/0249169 A1    Oct. 13, 2011

(51) Int. Cl.
 *G02B 9/12* (2006.01)
(52) U.S. Cl. .................................. 359/784; 359/754
(58) Field of Classification Search .................. 359/362, 359/365, 754, 756, 784, 785, 791, 796–797
See application file for complete search history.

(56) References Cited

U.S. PATENT DOCUMENTS

| | | | |
|---|---|---|---|
| 7,457,053 B2 * | 11/2008 | Oh et al. | 359/793 |
| 7,764,445 B2 * | 7/2010 | Oh et al. | 359/794 |
| 2010/0091384 A1 * | 4/2010 | Deng et al. | 359/708 |
| 2010/0246030 A1 * | 9/2010 | Chang et al. | 359/717 |

* cited by examiner

*Primary Examiner* — James Greece
(74) *Attorney, Agent, or Firm* — Muncy, Geissler, Olds & Lowe, PLLC

(57) ABSTRACT

Image capture lens modules are presented. An image capture lens module includes a first compound lens with a first element and a second element arranged in sequence from an object side to an image side. The second element is a plano-convex lens with a convex surface facing the image side on a paraxial line. A second compound lens includes a third element, a fourth element, and a fifth element arranged in sequence from an object side to an image side. The third element is a plano-convex lens with a convex surface facing the object side on a paraxial line, and the fifth element is a plano-concave lens with a concave surface facing the image side on a paraxial line. A third compound lens includes a sixth element and a seventh element arranged in sequence from an object side to an image side, wherein the sixth element is a plano-convex lens with a convex surface facing the object side on a paraxial line.

16 Claims, 2 Drawing Sheets

IMAGE CAPTURE LENS MODULES AND IMAGE CAPTURE SYSTEMS

BACKGROUND OF THE INVENTION

1. Field of the Invention

The invention relates to image capture lens modules and more particularly to high performance wafer-level packaged image capture lens modules.

2. Description of the Related Art

Digital cameras utilizing high-resolution electronic imaging sensors typically require high resolution optical components such as image capture lens modules. The design and manufacturing of camera modules for portable electronic products is extremely challenging. Some pervasive factors include: high production volume, constant price erosion, size limitations and changing performance and functionality requirements.

Image capture lenses on a digital camera module that focus a scene onto an imager can be as few as one lens on a digital camera module, or as many as four in a digital camera module with mega pixel resolution. Usually, the lenses are plastic, due to lower costs. However, higher quality digital cameras sometimes use glass for the first lens because of its superior optical properties.

Japanese Patent Application Laid-Open No. 2008-287006, the entirety of which is hereby incorporated by reference, discloses an imaging lens with aberration correction, a short optical length, a secured back focus, and steady optical performance in a high temperature environment.

FIG. 1 is a schematic view illustrating a configuration of a conventional imaging lens. Referring to FIG. 1, an imaging lens includes a first diaphragm S1, a first junction type compound lens 10, a second diaphragm S1, and a second junction type compound lens 20 all of which are arranged in sequence from an object side to an image side. The first junction type compound lens 10 includes a first lens L1, a second lens L2, and a third lens L3 arranged in sequence from an object side to an image side. The second junction type compound lens 20 includes a fourth lens L4, a fifth lens L5, and a sixth lens L6 arranged in sequence from an object side to an image side. A cover glass 30 is inserted between the second junction type compound lens 20 and an image sensing element 40. Conventionally, the imaging lens is packaged using wafer level packaging technology. There are, however, some problems for the conventional wafer-level packaged image capture lens module, such as exacerbated optical performances, limitations to substrate and lens replication processes and alignment inaccuracies of the optical center of the lens module.

US Pub. No. 2007/0126898, the entirety of which is hereby incorporated by reference, discloses a three-compound lens module which uses wafer to wafer bonding to stack lens elements. Note that, commonly, the conventional art does not describe lens design of wafer level compound lens, mainly because of worsening optical performances when compared with conventional high quality stacked lens modules, such as plastic lens modules or glass lens modules.

For some applications, a small chief ray angle (CRA) of an image detector is designed for superior image performances. Meanwhile, conventional lens designs are not suitable for low module height and small lens scale requirements. Thus, allowing reduction of the height of the image capture lens module when compared to prior art. Note that if the FFL of an image capture lens can be reduced, image blemish effect may easily be eliminated.

BRIEF SUMMARY OF THE INVENTION

Embodiments of the invention provide an image capture lens module, comprising: a first compound lens with a first element and a second element arranged in sequence from an object side to an image side, wherein the second element is a plano-convex lens with a convex surface facing the image side on a paraxial line; a second compound lens with a third element, a fourth element, and a fifth element arranged in sequence from an object side to an image side, wherein the third element is a plano-convex lens with a convex surface facing the object side on a paraxial line, and the fifth element is a plano-concave lens with a concave surface facing the image side on a paraxial line; and a third compound lens with a sixth element and a seventh element arranged in sequence from an object side to an image side, wherein the sixth element is a plano-convex lens with a convex surface facing the object side on a paraxial line.

Embodiments of the invention further provide an image capture system, comprising: a first compound lens with a first element and a second element arranged in sequence from an object side to an image side, wherein the second element is a plano-convex lens with a convex surface facing the image side on a paraxial line; a second compound lens with a third element, a fourth element, and a fifth element arranged in sequence from an object side to an image side, wherein the third element is a plano-convex lens with a convex surface facing the object side on a paraxial line, and the fifth element is a plano-concave lens with a concave surface facing the image side on a paraxial line; and a third compound lens with a sixth element and a seventh element arranged in sequence from an object side to an image side, wherein the sixth element is a plano-convex lens with a convex surface facing the object side on a paraxial line; and an image detector with a cover glass hybrid with the seventh element of the third compound lens, wherein the first compound lens, the second compound lens, the third compound lens, and the cover glass are arranged in sequence from an object side to an image side.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

As key features and main aspects of the invention, embodiments of the invention provide wafer scale lenses which can be stacked into an image capture lens module. The wafer scale lens structure contains three compound optical lenses with four curved optical surfaces. The wafer scale lens structure is made of materials with UV curable polymer compounds by molding.

Figure 1:
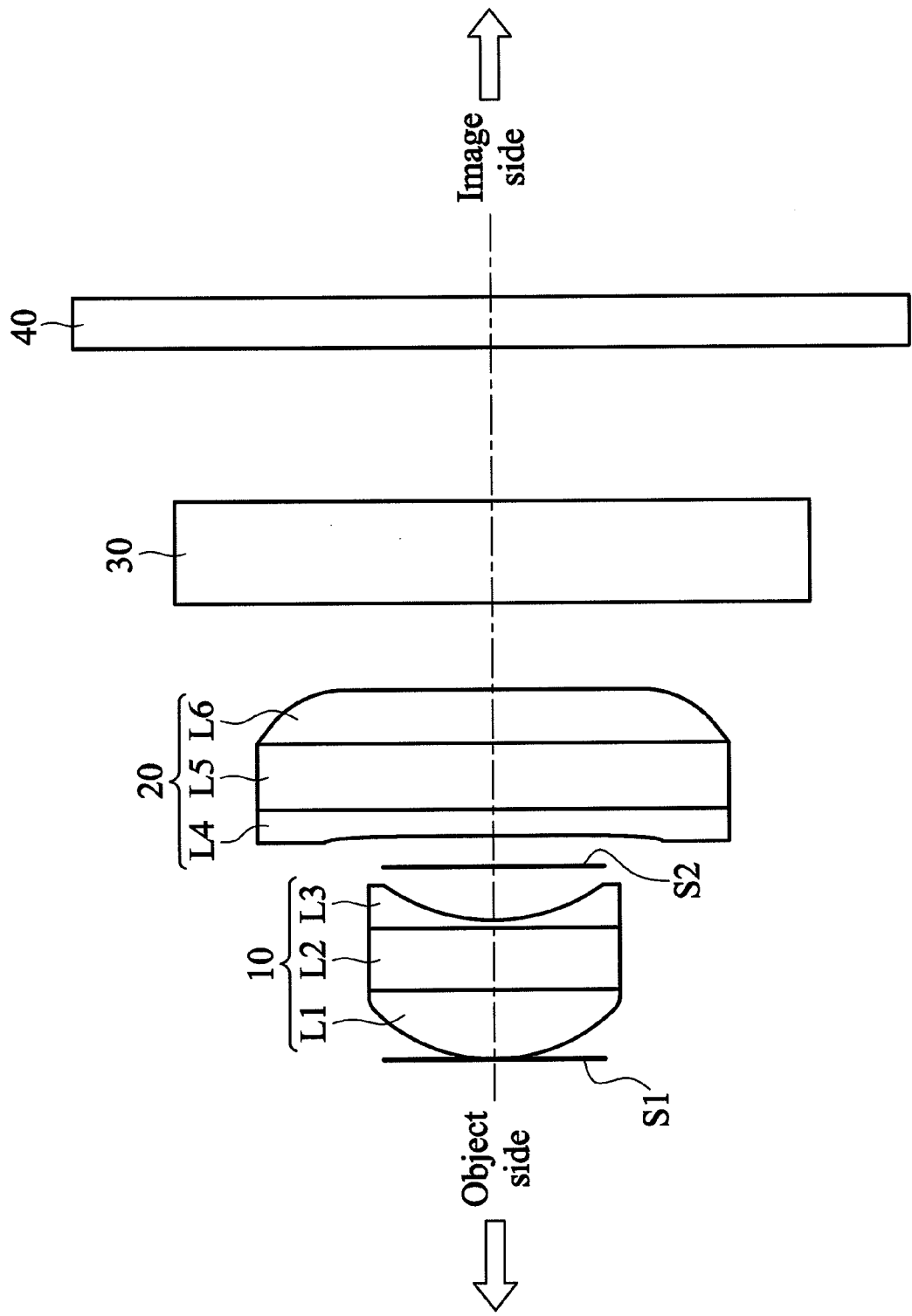
FIG. 1 is a schematic view illustrating a configuration of a conventional imaging lens.
Figure 2:
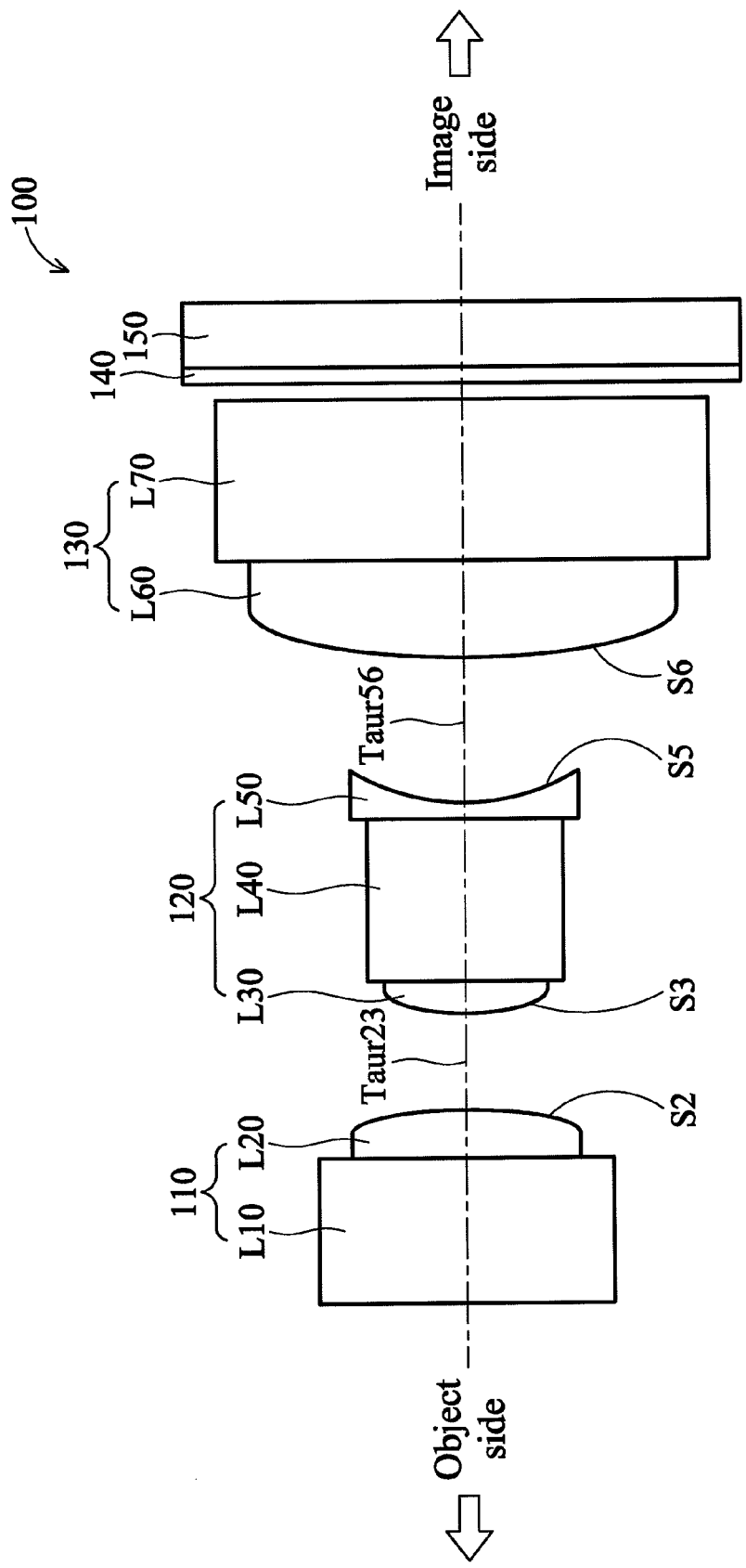
FIG. 2 is a schematic view illustrating a stacked compound lens configuration of a first embodiment of the image capture lens module of the invention.

FIG. 2 is a schematic view illustrating a stacked compound lens configuration of a first embodiment of the image capture lens module of the invention. Referring to FIG. 2, an image capture lens module 100 comprises a first compound lens 110, a second compound lens 120, a third compound lens 130, and a cover glass 140 for an image detector 150 (e.g., a CMOS image sensor chip) arranged in sequence from an object side to an image side. The first compound lens 110 includes a first element L10 and a second element L20 arranged in sequence from an object side to an image side. The second element L20 can include a plano-convex lens with a convex surface facing the image side on a paraxial line. The second compound lens 120 includes a third element L30, a fourth element L40, and a fourth element L50 arranged in sequence from an object side to an image side. The third element L30 can include a plano-convex lens with a convex surface facing the object side on a paraxial line. The fifth element L50 can include a plano-concave lens with a concave surface facing the image side on a paraxial line. The third compound lens 130 includes a sixth element L60 and a seventh element L70 arranged in sequence from an object side to an image side. The sixth element S60 can include a plano-convex lens with a convex surface facing the object side on a paraxial line. In order to achieve high optical performance, the third compound lens 130 is arranged adjacent to the image detector 150. For example, the image detector 150 with a cover glass 140 is hybrid with the seventh element L70 of the third compound lens 130. According to an embodiment of the invention, the image detector 150 with a cover glass 140 and the seventh element L70 of the third compound lens 130 are directly bound together. There is no other constructed element disposed between the cover glass 140 and the seventh element L70. At most, the seventh element L70 of the third compound lens 130 and the cover glass 140 of the image detector device can be indirectly bound by an adhesive layer such as glues or the likes. The effective height of the image capture lens module and the image detector device can be thus compacted by the configuration of the first embodiment.

Note that a spacer (not shown) may be disposed between the first compound lens 110 and the second compound lens 120. Another spacer (not shown) may be disposed between the second compound lens 120 and the third compound lens.

In one embodiment, a curvature radius of the second element L20 is positive, a curvature radius of the third element L30 is positive, a curvature radius of the fifth element L50 is negative, and a curvature radius of the sixth element L60 is positive. The second, the third, the fifth, and the sixth elements can comprise reflowable and VU curable polymer compounds by molding. In another embodiment, the first, fourth and seventh elements L10, L40, L70 comprise an optical-parallel plate.

Alternatively, the image side of the second element L20 and the object side of the third element L30 are aspherical, and the image side of the fifth element L50 and the object side of the sixth element L60 are aspherical.

In another embodiment, the following relations are further satisfied:

$$EFL_{g3} > |EFL_{g1}|$$

where:
$EFL_{g1}$ is effective focal length of the first compound lens; and
$EFL_{g3}$ is effective focal length of the third compound lens.

In another embodiment, the following relations are further satisfied:

$$EFL_{g3} > EFL_{g2},$$

where:
$EFL_{g2}$ is effective focal length of the second compound lens; and
$EFL_{g3}$ is effective focal length of the third compound lens.

In another embodiment, the following relations are further satisfied:

$$80 > T_{air56}/T_{air23} > 5,$$

where:
$T_{air23}$ is the distance between the second element L20 and the third element L30, and
$T_{air56}$ is the distance between the fifth element L50 and the sixth element L60.

Note that the first, fourth and seventh elements L10, L40, L70 may also comprise high refraction index wafer-level substrates. For example, refraction indices of the wafer-level substrates approximately exceed 1.6, and the abbe number of the wafer-level substrates is less than 35. In one embodiment, the wafer-level substrates of the second element and the fifth element can be made of lanthanum dense flint (LaSF), lanthanum flint (LaF), barium dense flint (BaSF), flint (F), and other suitable optical materials. The second, the third, the fifth, and the sixth elements can comprise reflowable and VU-curable materials such as a transparent curable silicone resin, or a thermosetting resin material.

In further another embodiment of the invention, an image capture system including a wafer-level packaged image capture lens module and an image detector (e.g., a CMOS image sensor chip) is provided. For example, the image capture system is directed to a mobile phone with digital still camera (DSC) applications. The wafer-level packaged image capture lens module and the image detector can easily be integrated with other peripheral units, such as a row decoder and a column decoder, an analog to digital converter (ADC), and a digital signal processor to form a system on a silicon chip.

While the invention has been described by way of example and in terms of exemplary embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image capture lens module, comprising:
   a first compound lens with a first element and a second element arranged in sequence from an object side to an image side, wherein the second element is a plano-convex lens with a convex surface facing the image side on a paraxial line;
   a second compound lens with a third element, a fourth element, and a fifth element arranged in sequence from an object side to an image side, wherein the third element is a plano-convex lens with a convex surface facing the object side on a paraxial line, and the fifth element is a plano-concave lens with a concave surface facing the image side on a paraxial line; and
   a third compound lens with a sixth element and a seventh element arranged in sequence from an object side to an image side, wherein the sixth element is a plano-convex lens with a convex surface facing the object side on a paraxial line.

2. The image capture lens module according to claim 1, wherein the first element, the fourth element, and the seventh element comprise high refraction index substrates.

3. The image capture lens module according to claim 1, wherein the second, the third, the fifth, and the sixth elements comprise reflowable and VU curable polymer compounds.

4. The image capture lens module according to claim 1, wherein the following relations are further satisfied:

$$EFL_{g3} > EFL_{g2}$$

where:
$EFL_{g2}$ is effective focal length of the second compound lens; and
$EFL_{g3}$ is effective focal length of the third compound lens.

5. The image capture lens module according to claim 1, wherein the following relations are further satisfied:

$$EFL_{g3} > |EFL_{g1}|$$

where:
$EFL_{g1}$ is effective focal length of the first compound lens; and
$EFL_{g3}$ is effective focal length of the third compound lens.

6. The image capture lens module according to claim 1, wherein the following relations are further satisfied:

$$80 > T_{air56}/T_{air23} > 5,$$

where:
$T_{air23}$ is the distance between the second element and the third element, and
$T_{air56}$ is the distance between the fifth element and the sixth element.

7. The image capture lens module according to claim 1, wherein the first, fourth, and seventh elements comprise an optical-parallel plate.

8. The image capture lens module according to claim 1, further comprising a cover glass for an image detector hybrid with the third compound lens, wherein the first compound lens, the second compound lens, the third compound lens, and the cover glass are arranged in sequence from an object side to an image side.

9. An image capture system, comprising:
a first compound lens with a first element and a second element arranged in sequence from an object side to an image side, wherein the second element is a plano-convex lens with a convex surface facing the image side on a paraxial line;
a second compound lens with a third element, a fourth element, and a fifth element arranged in sequence from an object side to an image side, wherein the third element is a plano-convex lens with a convex surface facing the object side on a paraxial line, and the fifth element is a plano-concave lens with a concave surface facing the image side on a paraxial line; and
a third compound lens with a sixth element and a seventh element arranged in sequence from an object side to an image side, wherein the sixth element is a plano-convex lens with a convex surface facing the object side on a paraxial line; and
an image detector with a cover glass hybrid with the seventh element of the third compound lens, wherein the first compound lens, the second compound lens, the third compound lens, and the cover glass are arranged in sequence from an object side to an image side.

10. The image capture system according to claim 9, wherein the first element, the fourth element, and the seventh element comprise high refraction index substrates.

11. The image capture system according to claim 9, wherein the second, the third, the fifth, and the sixth elements comprise reflowable and VU curable polymer compounds.

12. The image capture system according to claim 9, wherein the following relations are further satisfied:

$$EFL_{g3} > EFL_{g2}$$

where:
$EFL_{g2}$ is effective focal length of the second compound lens; and
$EFL_{g3}$ is effective focal length of the third compound lens.

13. The image capture system according to claim 9, wherein the following relations are further satisfied:

$$EFL_{g3} > |EFL_{g1}|$$

where:
$EFL_{g1}$ is effective focal length of the first compound lens; and
$EFL_{g3}$ is effective focal length of the third compound lens.

14. The image capture system according to claim 9, wherein the following relations are further satisfied:

$$80 > T_{air56}/T_{air23} > 5,$$

where:
$T_{air23}$ is the distance between the second element and the third element, and
$T_{air56}$ is the distance between the fifth element and the sixth element.

15. The image capture system according to claim 9, wherein the first, fourth, and seventh elements comprise an optical-parallel plate.

16. The image capture system according to claim 9, further comprising a cover glass for an image detector hybrid with the third compound lens, wherein the first compound lens, the second compound lens, the third compound lens, and the cover glass are arranged in sequence from an object side to an image side.

* * * * *

UNITED STATES PATENT AND TRADEMARK OFFICE
CERTIFICATE OF CORRECTION

PATENT NO. : 8,194,334 B2
APPLICATION NO. : 12/757563
DATED : June 5, 2012
INVENTOR(S) : Yun-Chiang Hsu et al.

It is certified that error appears in the above-identified patent and that said Letters Patent is hereby corrected as shown below:

Title page, item (75), the word "Iaoyuan County" should read --Taoyuan County--.

Signed and Sealed this
Twenty-eighth Day of August, 2012

David J. Kappos
*Director of the United States Patent and Trademark Office*